(12) United States Patent
Strauss et al.

(10) Patent No.: US 7,947,232 B2
(45) Date of Patent: May 24, 2011

(54) HF ALKYLATION REACTOR

(75) Inventors: Ramon A. Strauss, Herndon, VA (US); Ramesh R. Hemrajani, Millington, NJ (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 482 days.

(21) Appl. No.: 11/987,427

(22) Filed: Nov. 30, 2007

(65) Prior Publication Data

US 2008/0138259 A1    Jun. 12, 2008

Related U.S. Application Data

(60) Provisional application No. 60/873,287, filed on Dec. 7, 2006.

(51) Int. Cl.
*F28D 7/00*   (2006.01)
*B01J 8/02*   (2006.01)

(52) U.S. Cl. ........ 422/201; 422/200; 422/211; 165/145; 165/157; 585/710; 585/720; 585/721

(58) Field of Classification Search ................. 422/201, 422/200, 211; 165/145, 157; 585/720, 710, 585/721
See application file for complete search history.

(56) References Cited

U.S. PATENT DOCUMENTS

| | | | | |
|---|---|---|---|---|
| 1,517,673 A * | 12/1924 | Eberle | ........................ | 184/104.3 |
| 2,855,449 A * | 10/1958 | Owen | ........................... | 585/712 |
| 3,006,739 A * | 10/1961 | Van Pool | ...................... | 422/201 |
| 3,150,934 A * | 9/1964 | Hazard | ........................ | 422/259 |
| 3,249,649 A * | 5/1966 | Sherk et al. | .................... | 585/714 |
| 3,435,092 A * | 3/1969 | Hutson, Jr. et al. | ........... | 585/720 |
| 3,469,949 A * | 9/1969 | Borst, Jr. | ....................... | 422/201 |
| 3,501,536 A * | 3/1970 | Borst, Jr. | ....................... | 585/720 |
| 3,560,587 A | 2/1971 | Borst, Jr. | | |
| 3,601,536 A * | 8/1971 | Calfee | ........................... | 348/470 |
| 3,686,354 A | 8/1972 | Hervert | | |
| 3,914,111 A | 10/1975 | Anderson | | |
| 4,041,101 A | 8/1977 | Sobel | | |
| 4,127,389 A * | 11/1978 | Hackemesser et al. | ....... | 422/201 |
| 4,724,754 A * | 2/1988 | Crozat et al. | .................... | 99/348 |
| 5,101,892 A * | 4/1992 | Takeuchi et al. | .............. | 165/158 |
| 5,161,605 A * | 11/1992 | Gutlhuber | ..................... | 165/103 |
| 5,821,390 A * | 10/1998 | Ruppel et al. | ................. | 568/470 |
| 6,167,951 B1 * | 1/2001 | Couch et al. | ................... | 165/160 |
| 6,582,667 B1 * | 6/2003 | Ogata et al. | .................... | 422/201 |
| 2005/0107483 A1 * | 5/2005 | Sakakura et al. | ............. | 518/726 |

* cited by examiner

*Primary Examiner* — Walter D Griffin
*Assistant Examiner* — Huy-Tram Nguyen
(74) *Attorney, Agent, or Firm* — Glenn T. Barrett; Malcolm D. Keen

(57) ABSTRACT

An improved reactor for an HF alkylation unit of the shell-and-tube heat exchanger type has an axial tube bundle to provide cooling for the reactor and a centrally-located axial sparger system for injecting and dispersing the hydrocarbon reactants into the flow path in the reactor. The sparger comprises an axially-extensive tube with outlet nozzles for the hydrocarbon reactants arranged around the tube, preferably with differing radial angles, at different locations along the length of the sparger.

9 Claims, 3 Drawing Sheets

HF ALKYLATION REACTOR

CROSS REFERENCE TO RELATED APPLICATIONS

This application claims the priority of U.S. Application Ser. No. 60/873,287, filed 7 Dec. 2006.

FIELD OF THE INVENTION

This invention relates to isoparaffin/olefin alkylation and more particularly, to hydrofluoric acid (HF) alkylation. In this specification, the term "alkylation" will be used to refer to the isoparaffin/olefin alkylation process used to make gasoline blend components useful in aviation and motor gasolines and "HF alkylation" to this process using hydrofluoric acid as the catalyst.

BACKGROUND OF THE INVENTION

The isoparaffin/olefin alkylation process is widely used to manufacture a high octane quality blend component for aviation and motor gasoline which is also valued for its relatively low vapor pressure, low sensitivity and, because of its freedom from aromatic components, its environmental acceptability. The process typically reacts a C3 to $C_5$ olefin with isobutane in the presence of an acidic catalyst to produce the alkylate product.

Industrial alkylation processes have historically used concentrated hydrofluoric (HF) or sulfuric acid catalysts under relatively low temperature conditions. Acid strength is preferably maintained at 88 to 94 weight percent by the continuous addition of fresh acid and the continuous withdrawal of spent acid.

Hydrofluoric and sulfuric acid alkylation processes share inherent drawbacks including environmental and safety concerns, acid consumption, and sludge disposal, but in spite of efforts to develop an inherently safe alkylation process, both processes have achieved widespread utilization with the HF process being noted for producing a higher quality product with more favorable unit economics. Although hydrogen fluoride, or hydrofluoric acid (HF) is highly toxic and corrosive, extensive experience in its use in the refinery have shown that it can be handled safely, provided the hazards are recognized and precautions taken. The HF alkylation process is described in general terms in *Modern Petroleum Technology*, Hobson et al (Ed), Applied Science Publishers Ltd. 1973, ISBN 085334 487 6. A survey of HF alkylation may be found in *Handbook of Petroleum Refining Processes*, Meyers, R. A. (Ed.), McGraw-Hill Professional Publishing, 2nd edition (1 Aug. 1996), ISBN: 0070417962.

In recent years the design of the HF alkylation reactor has stagnated with no significant changes since the early 1970s. One reactor type widely used in the industry utilizes a shell and tube heat exchanger combined with a sparger system. A typical design is shown in U.S. Pat. No. 3,914,111 (Anderson). In this design, the HF alkylation acid is continuously circulated through the exchanger-reactor past baffles designed to allow a homogenous flow, while the hydrocarbon reactants are dispersed into the liquid in the acid flow direction through spray nozzles installed along a number of spargers which intrude into the reactor at intervals along the length of the reactor from an exterior supply manifold. Similar reactors are shown in U.S. Pat. No. 3,560,587 (Borst), U.S. Pat. No. 3,686,354 (Hervert) and U.S. Pat. No. 4,041,101 (Sobel).

The formation of small droplets of the hydrocarbon reactants in the flowing acid stream is key to the effectiveness of the process. Secondary reactions and loss of product quality can result from less than optimum liquid dispersion and large droplets. The conventional reactor system described above is prone to a number of defects arising mainly from the location and orientation of the spargers with respect to the baffles, including the following:

Inefficient liquid dispersion allows for collision of droplets increasing coalescence and reducing droplet interfacial area, affecting product quality and yields;

Liquid bypassing reduces the interfacial area in the reactor;

Reactor capacity is limited by the number of spargers and nozzles which, in turn is limited by the need to have an inlet port penetrating the reactor shell for each sparger conduit;

Good distribution of sparger nozzles is important to avoid localized high temperatures resulting from the exothermic heat of reaction.

The present invention has been devised with a view to reducing the extent of these problems in the alkylation reactor. A new type of sparger affords improved droplet dispersion without replacing existing reactors; in fact, existing reactors may be easily retrofitted with the new type of sparger at very low cost.

SUMMARY OF THE INVENTION

According to the present invention a reactor for an HF alkylation unit of the shell-and-tube heat exchanger type with an axial tube bundle to provide cooling for the reactor has a centrally-located axial sparger system for injecting and dispersing the hydrocarbon reactants in the acid flow path along the length of the reactor shell. The sparger comprises an axially-extensive tube with outlet nozzles for the hydrocarbon reactant at axially spaced locations along the tube. The outlet nozzles are preferably directed around the tube with differing radial angles at different locations along the length of the sparger.

DRAWINGS

DETAILED DESCRIPTION

Figure 1:
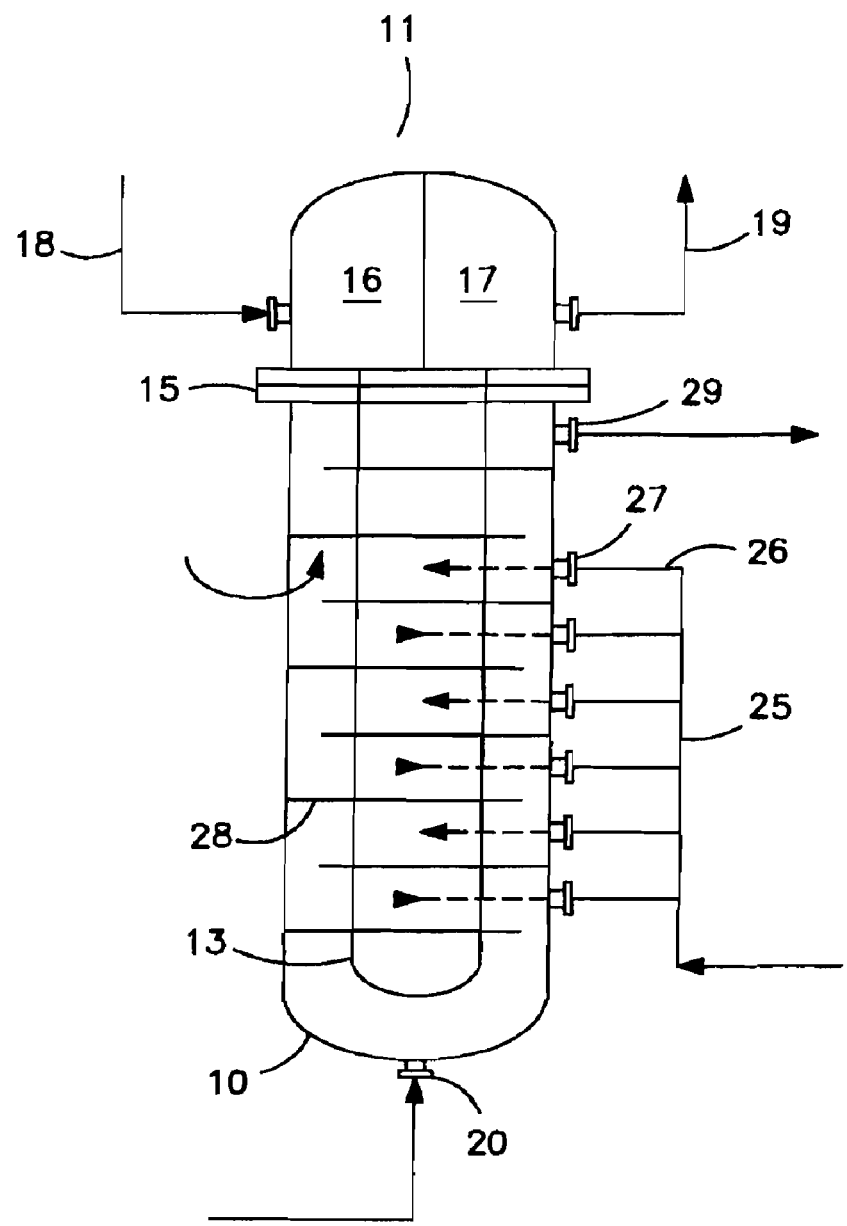
FIG. 1 is a section of a conventional HF alkylation reactor of the shell-and tube heat exchanger type.

FIG. 1 shows a section through a conventional HF alkylation reactor of the shell-and-tube heat exchanger type. It incorporates the design principles of a well-established commercial reactor design comparable to the one shown in FIG. 1 of U.S. Pat. No. 3,914,1111 (Anderson), to which reference is made for a more detailed description of this type of reactor. Reactors of this type may be disposed either horizontally or vertically but normally are disposed vertically. The reactor comprises a generally cylindrical reactor shell 10 which is joined to a tubehead 11 which holds a tube bundle 13. The tube bundle comprises a large number of U-shaped tubes sealed at their open ends to tubehead 11 although only one is shown here in illustrative fashion for clarity. The reactor shell is joined to the tubehead at a flange joint 15 providing a liquid tight seal between these two components. Tubehead 11 is divided into two compartments, 16, 17 with cooling water inlet 18 provided for compartment 16 and an outlet 19 for compartment 17. Cooling water circulates from compartment 16 through tube bundle 13 to compartment 17 in order to maintain the reactor and its contents at the requisite temperature for the alkylation reaction, typically from 15°-50° C.

An inlet 20 for the HF alkylation acid is provided at the end of the shell remote from the tubehead and a supply manifold 25 for the hydrocarbon reactants extends outside the shell along the length of the reactor. A number of radially-extensive hydrocarbon feed conduits, one of which is indicated at 26, pass through the side wall of the reactor at individual inlet ports (one only indicated by 27) and pass across the reactor between the tubes in the tube bundle. Each conduit is provided inside the reactor with spray heads directed in the direction in which the fluids pass in the reactor. Baffles 28 arranged transversely in alternating fashion along the length of the reactor provide an extended fluid flow path which is intended to maximize mixing of reactants and catalyst as well as providing an appropriate residence time in the reactor. An outlet 29 is provided at the end of the reactor next the tubehead for the reaction effluent comprising alkylate product, excess isoparaffin, by-products such as the acid-soluble oil, and alkylation acid.

Figure 2:
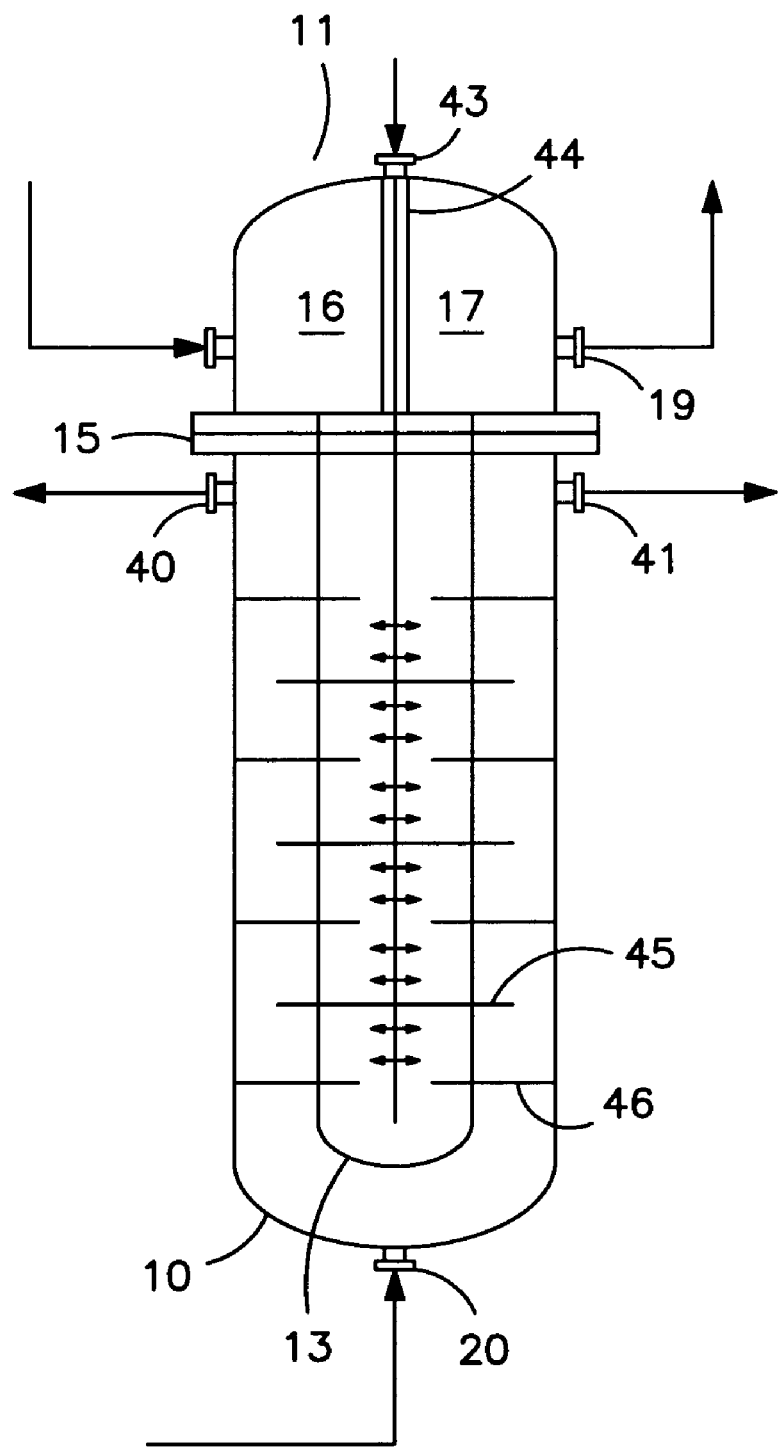
FIG. 2 is a simplified vertical section of an HF alkylation reactor with an axial sparger system.

One form of the improved reactor of the present invention is illustrated in FIG. 2 and accordingly, similar parts have been allocated the same reference numerals. It resembles the conventional reactor in being of the shell-and-tube heat exchanger type, normally in a vertical disposition with a tube bundle 13 fed with cooling water from tube head 11. Inlet 20 is provided for the HF alkylation acid acting as catalyst in the reaction and reactor effluent leaves the reactor through outlets 40, 41 disposed at the end of the reactor shell adjacent the tubehead.

The hydrocarbon reactants are injected into the reactor by means of an axial sparger system which comprises a centrally located, axial supply tube 42 sealed to tubehead 11, which enters the reactor through inlet port 43 in tubehead 11 to inject and disperse the hydrocarbons into the alkylation acid. An axial conduit 44 in tubehead 11 surrounds the supply tube to isolate the supply tube and allow for relative movement of the components. The supply tube extends axially into the reactor space, down through the center of tube bundle 13, terminating above the bend in the bottom of the tube bundle. A baffle system comprising sets of successive baffles located axially along the length of the reactor directs the liquids flowing in the reactor along an extended flow path and promotes mixing of the injected hydrocarbons with the acid catalyst.

Figure 3A:
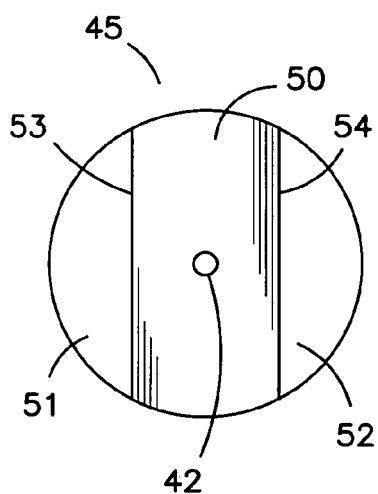
FIGS. 3a and 3B show a segmental baffle system for the reactor.
Figure 3B:
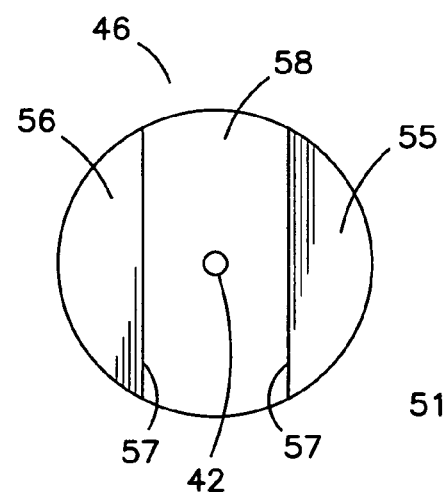

The transverse baffles are arranged alternately along the axis of the reactor shell to provide an extended sinuous flow path for the reactants and the acid. The baffles are arranged alternately to have alternate central and peripheral flow passages. One form of baffle arrangement using segmented baffles is shown in FIGS. 3A and 3B. In this case, baffles 45, 46 have a peripheral flow passage and a central flow passage, respectively, with other similar baffles being arranged in alternating fashion from one to the other, successively along the axis of the reactor. Baffle 45 shown in FIG. 3A comprises a plate member 50 extending transversely from one interior wall of the reactor to the other with chordal sides 53 and 54 defining peripheral flow passages 51 and 52 on each side of the baffle member. The plate member has arcuate ends abutting the interior side walls of the reactor shell, permitting it to be fixed to the side walls, e.g. by welding. The axial supply tube 42 passes through a centrally located aperture in the plate and can be fixed to it provide location and support for the tube. Baffle 46 shown in FIG. 3B which is placed in the reactor alternately along the reactor axis with baffle 45, comprises two plate members 55 and 56, each with a single chordal edge 57 and an arcuate side edge 58 abutting the interior wall of the reactor shell to which each plate member is fixed, e.g. by welding. The supply tube 42 passes through the central chordal flow passage 59 between plate members 55 and 56. The baffles are arranged with respect to tube bundle 13 by having the tube bundle pass around or through the baffles, for example, the tubes in the tube bundle might pass around the single baffle plate shown in FIG. 3A and through suitably disposed apertures in the two baffle plates of FIG. 3B. For convenience in fabrication, the baffles may be made in segments with appropriately formed apertures for the tube bundle and then assembled around the tube bundle. The alternating sequence of segmented baffles provides an extended sinuous flow path for the reactants along the length of the reactor to provide the requisite residence time for the hydrocarbon reactants in the reactor while also promoting good mixing in combination with the axial sparger system. while reducing backmixing, a factor important for obtaining high yield and selectivity.

Figure 4A:
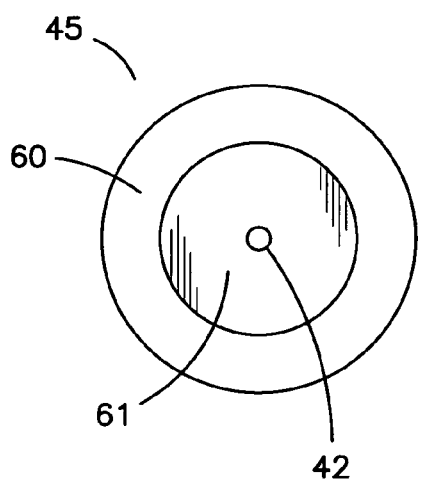
FIGS. 4A and 4B show a variant form of reactor baffle system.
Figure 4B:
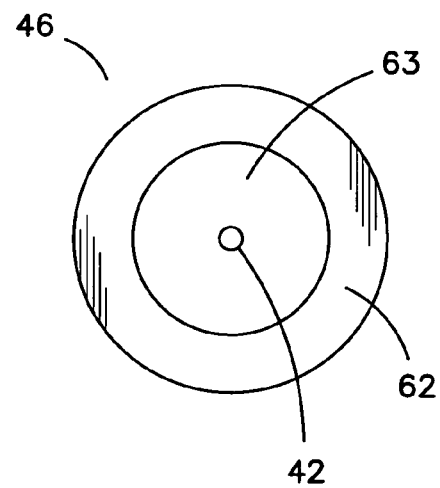

A variant of this type of reactor utilizes the same constructional arrangements except that the baffles alternately have central and annular flow apertures so as to provide a flow path which ideally is alternately radially inwards and outwards as the mixture of reactants and the alkylation acid pass along the length of the reactor. In this baffle arrangement, one set of baffles are of annular configuration with the peripheries at the interior wall of the reactor shell and with central flow apertures. The other set is of the annular flow type with diameters less than that of the reactor interior diameter, to define a peripheral flow passage between the outside edge of the baffles and the interior surface of the reactor wall. The two sets alternate along the axial length of the reactor so as to provide a flow path which is alternately radially inwards and radially outwards. This type of baffle arrangement is shown in FIGS. 4A and 4B. In this case, baffle 45 shown in FIG. 4A, is of the type with an peripheral, annular flow passage 60 defined by the interior wall of the reactor shell and the circular periphery of the baffle member 61 which is in the form of a circular plate having a diameter smaller than that of the reactor shell so that annular flow passage 60 is left between the edge of the plate and the inner wall of the reactor shell. This baffle is supported in its location by the tube bundle and associated supports; appropriate apertures are formed in the baffle (not shown) through which the tube bundle passes. Baffle 46 in this arrangement, as shown in FIG. 4B is an annular plate 62 with a central flow aperture 63 on the reactor shell axis to permit the flow of the reactants and acid. This baffle can be stayed on the shell wall as well as by the tube bundle. If the tube bundle is suitably sized, it may pass through the central flow passageway in the annular baffle plate or, if the tube bundle cannot be accommodated in this way, cut-outs in the baffle plate can be made to provide the necessary clearances. Successive baffles in the reactor follow, alternately, the configuration of baffles 45 and 46 to provide the radially-alternating flow path for the reactants and alkylation acid catalyst. For convenience in fabrication again, the baffles may be made in segments with appropriately formed apertures or cut-outs for the tube bundle and then assembled around the tube bundle. This baffle system also promotes good mixing with the axial sparger system as well as providing the requisite residence time for the hydrocarbon reactants and acid catalyst.

The outlet nozzles may be provided in the form of simple outlet orifices in the along the length of the supply tube for injecting the hydrocarbon reactants into the reactor. It is preferred, however, to use nozzles which promote good mixing by injecting the olefin reactant in the form of a spray of predetermined configuration, for example, a fan, conical or hollow conical spray. The nozzles are disposed at intervals around and along the length of the supply tube within the reactor so as to inject the hydrocarbon reactants at intervals along the flow path taken by the acid in a manner which promotes good mixing of the reactants with the catalyst. The nozzles will normally and preferably direct the sprays orthogonally to the axis of the supply tube, e.g. horizontally with the normal vertical reactor disposition although they may also be angled to direct the sprays in the direction of flow of the fluids in the reactor. It is preferred that the nozzles should be oriented at different radial angles at different axial locations in the reactor. To take a simple example with only two nozzles at each axially spaced location, the nozzles might be oriented with their discharge angles as follows:

| Level 1 | 0° | 180° |
| Level 2 | 90° | 270° |
| Level 3 | 0° | 180° |
| Level 4 | 90° | 270° |

If, for example, four nozzles were used at each axially-spaced location, the arrangement might suitably be:

| Level 1 | 0° | 90° | 180° | 270° |
| Level 2 | 45° | 135° | 225° | 315° |
| Level 3 | 0° | 90° | 180° | 270° |
| Level 4 | 45° | 135° | 225° | 315° |

An arrangement with three nozzles at each axial location could be as follows:

| Level 1 | 0° | 120° | 240° |
| Level 2 | 60° | 180° | 300° |
| Level 3 | 0° | 120° | 240° |
| Level 4 | 60° | 180° | 300° |

It is not, however, necessary to have the same number of nozzles at each axial location and, for example, an alternating two-three arrangement might be used as follows:

| Level 1 | 0° | 180° | |
| Level 2 | 0° | 120° | 240° |
| Level 3 | 90° | 270° | |
| Level 4 | 60° | 180° | 300° |

Other nozzle arrangements and orientations are possible and may be selected if cold flow modeling or other simulation shows that good mixing can be achieved by their use. In practice, more than two, three or four nozzles may be provided at each axial location in order to improve dispersion of the hydrocarbon reactants into the flowing reaction mixture.

The preferred type of nozzle is the fan type, exemplified by the Bete™ NF nozzle, the exact version of the nozzle being dependent on the flow rate appropriate to the size of the unit. Fan spay angles from about 30° to 90° have been found to be effective with the spray angle being chosen in accordance with the number of nozzles at each axial location. For purposes of determining nozzle orientation, the center of the spray pattern provides a suitable reference axis.

Small droplets can be achieved without requiring additional energy and the use of the baffles is immediately optimized because the hydrocarbon injection points are located consistently with the baffle arrangement; in the conventional design, the one-sided location of the system introduces irregularities into the flow pattern which are not favorable for good mixing of the reactants into the acid. An additional advantage is an immediate increase in capacity of the equipment because there is room for more nozzles compared to the conventional design: the capacity of the unit can be increased without replacing the reactors. In fact, existing reactors can be easily retrofitted with this invention at a very low cost. This invention improves the hydrocarbon dispersion in the reactor which can be expected to result in better yields and octane.

The invention also offers maintenance advantages because only one sparger is needed as compared to the conventional configuration with 4-6 inlet conduits arranged along the length of the reactor, each with its own inlet port. The spargers in the conventional design must, in addition, be properly oriented when installed because the nozzles must follow the direction of the acid flow. This process is difficult and time consuming and maintenance personnel seldom ensure proper alignment it during maintenance turnarounds. As a result, unit performance is adversely affected and the problem cannot be corrected until the next turnaround (usually 4-5 years cycle). In this invention, the nozzle installation is not an issue because the nozzles are located radially on the sparger so that the hydrocarbon droplets will always follow the direction of the acid.

The HF alkylation process can be carried out in the conventional manner using the normal reactants and HF alkylation catalyst under conventional conditions including temperatures, pressures, flow rates and other factors. The olefin feed will typically be $C_3$-$C_5$ olefins with preference being given to butylenes although propylene may also be used with corresponding changes in product properties and in the appropriate process conditions, as is known. The isoparaffin most favored for use in the HF alkylation process is isobutane. The alkylate product may be treated in the conventional way in the product recovery and purification section and fractionated to form the desired gasoline boiling range blend component.

The process may be operated with a vapor suppressant additive to improve safety margins in the event of an uncontrolled acid release from the unit. The vapor suppressant additives normally contemplated are those which reduce the volatility of the HF acid. Compounds of this type which have been proposed include organic sulfones, ammonia, amines such as the lower alkylamines (methyl to pentyl), pyridine, alkylpyridines, picoline, melamine, hexamethylenetetramine. A number of different sulfones have been proposed for this purpose but the one generally preferred is sulfolane (tetramethylenesulfone) with 3-methylsulfolane and 2,4-dimethylsulfolane also being suitable. A more detailed description of vapor suppressant additives of this type is given in U.S. Pat. No. 6,114,593. When a vapor suppressant additive is used the process is often referred to as modified HF alkylation (MHF).

The invention claimed is:

1. An HF alkylation reactor of the shell-and-tube heat exchanger type comprising a generally cylindrical reactor shell having:
   (i) a tubehead at one end supporting an axial tube bundle of U-shaped cooling tubes for passing cooling water through the interior of the reactor to provide cooling for the reactor;

(ii) an acid inlet for HF alkylation acid at the end remote from the tubehead;
(iii) an effluent outlet for alkylation reaction products at the end remote from the acid inlet;
(iv) a plurality of baffles within the reactor shell arranged transversely to the axis of the reactor shell which have alternately along the axis of the reactor shell (a) central flow apertures located inside the tube bundle in each alternate baffle and (b) peripheral flow passages around the circumference of each baffle and outside the tube bundle to define an extended fluid flow path for reactants from one end of the shell to the other and
(v) an axial sparger system for injecting hydrocarbon alkylation reactant into the reactor shell, the sparger system comprising a reactant supply tube extending longitudinally in the reactor shell and located at the axis of the generally cylindrical reactor shell, the supply tube having outlet nozzles for hydrocarbon alkylation reactant at axially spaced locations along the supply tube to direct the hydrocarbon reactants into the fluid flow path orthogonally to the axis of the supply tube with at least one axially located set of nozzles is disposed between each pair of transverse baffles.

2. An HF alkylation reactor according to claim 1 in which the cooling tubes are sealed at their open ends to the tubehead, and further comprising means for supplying cooling water to the tubes and means for withdrawing cooling water from the cooling tubes after passage through the tubes.

3. An HF alkylation reactor according to claim 1 in which the outlet nozzles for the hydrocarbon alkylation reactant are disposed at differing radial angles around the axis of the reactor at different locations along the axis of the reactor.

4. An HF alkylation reactor according to claim 3 in which the outlet nozzles are directed in two alternating radially angular arrangements at alternating axial locations along the reactant supply tube.

5. An HF alkylation reactor of the shell-and-tube heat exchanger type for reacting an isoparaffin hydrocarbon reactant with a light olefin hydrocarbon reactant in the presence of HF alkylation acid to produce a gasoline boiling range alkylation product, comprising:
(i) a generally cylindrical reactor shell;
(ii) an acid inlet at the end of the reactor shell remote from the tubehead;
(iii) at least one reaction product effluent outlet at the end of the reactor shell remote from the acid inlet;
(iv) a tubehead at one end of the reactor shell and sealed to the reactor shell to provide a reaction zone within the shell;
(v) an tube bundle of U-shaped cooling tubes sealed at their open ends to the tubehead, for passing cooling water through the interior of the cooling tubes to provide cooling for the reactor;
(vi) means for supplying cooling water to the tubes from the tubehead and for withdrawing cooling water from the cooling tubes through the tubehead after passage of cooling water through the tubes;
(vii) a plurality of transverse baffles within the reactor shell arranged transversely to the axis of the reactor shell to define an extended fluid flow path from one end of the shell to the other comprising (a) a first set of baffles each having a central flow aperture located inside the tube bundle and (b) a second set of baffles defining peripheral flow passages outside the tube bundle and between the edges of each baffle of this set and the interior wall of the reactor shell, the baffles of each set being disposed alternately with one another along the axis of the shell to define an extended fluid flow path for reactants from one end of the shell to the other;
(viii) an axial sparger for injecting hydrocarbon alkylation reactant into the interior of the reactor shell, the sparger comprising a reactant injection tube extending longitudinally in the reactor shell and located at the axis of the reactor shell;
(ix) outlet nozzles to direct hydrocarbon alkylation reactants into the fluid flow path orthogonally to the axis of the supply tube at axially spaced locations along the injection tube with at least one axially located set of outlet nozzles disposed between each pair of transverse baffles.

6. An HF alkylation reactor according to claim 5 in which at least two axially located sets of outlet nozzles are disposed between each pair of transverse baffles.

7. An HF alkylation reactor according to claim 5 in which the outlet nozzles for the hydrocarbons are disposed at differing radial angles around the axis of the reactor at successive locations along the axis of the reactor.

8. An HF alkylation reactor according to claim 7 in which the outlet nozzles are directed in at least two differing radially angular arrangements around the axis of the injection tube at different axial locations along the reactant injection tube.

9. An HF alkylation reactor according to claim 8 in which the outlet nozzles are directed in at least differing radially angular arrangements around the axis of the injection tube at alternating axial locations along the reactant injection tube.

\* \* \* \* \*